United States Patent
Huang et al.

(10) Patent No.: US 10,763,964 B2
(45) Date of Patent: Sep. 1, 2020

(54) BIDIRECTIONAL OPTICAL COMMUNICATION AND SENSING WDM ARCHITECTURE USING SAME FIBER TRANSMISSION BAND

(71) Applicant: NEC Laboratories America, Inc., Princeton, NJ (US)

(72) Inventors: Yue-Kai Huang, Princeton, NJ (US);
Ezra Ip, West Windsor, NJ (US);
Philip Nan Ji, Cranbury, NJ (US);
Ming-Fang Huang, Princeton, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/454,054

(22) Filed: Jun. 27, 2019

(65) Prior Publication Data
US 2020/0007234 A1    Jan. 2, 2020

Related U.S. Application Data

(60) Provisional application No. 62/691,143, filed on Jun. 28, 2018.

(51) Int. Cl.
| | | |
|---|---|---|
| *H04B 10/00* | (2013.01) | |
| *H04B 10/2543* | (2013.01) | |
| *H04B 10/25* | (2013.01) | |
| *H04J 14/00* | (2006.01) | |

(52) U.S. Cl.
CPC ..... *H04B 10/2543* (2013.01); *H04B 10/2589* (2020.05)

(58) Field of Classification Search
CPC .................................................. H04B 10/071
See application file for complete search history.

(56) References Cited

U.S. PATENT DOCUMENTS

| | | | |
|---|---|---|---|
| 10,211,920 B1 * | 2/2019 | Khaleghi | H04B 10/25253 |
| 10,432,302 B1 * | 10/2019 | Delgado | G01M 11/3154 |
| 2009/0022489 A1 | 1/2009 | Way | |
| 2011/0069302 A1 | 3/2011 | Hill et al. | |
| 2014/0077971 A1 * | 3/2014 | Archambault | H04B 10/0731 340/870.04 |
| 2018/0316419 A1 * | 11/2018 | Watte | H04B 10/071 |

\* cited by examiner

*Primary Examiner* — Daniel G Dobson
(74) *Attorney, Agent, or Firm* — Joseph Kolodka

(57) ABSTRACT

Aspects of the present disclosure describe systems, methods and structures providing bidirectional optical fiber communication and sensing using the same fiber transmission band and bidirectional WDM fiber sharing such that communications channels and optical fiber sensing channel(s) coexist on the same fiber. As a result, nonlinear interaction between communications channels and interrogating pulse(s) of sensing are much reduced or eliminated.

1 Claim, 6 Drawing Sheets

BIDIRECTIONAL OPTICAL COMMUNICATION AND SENSING WDM ARCHITECTURE USING SAME FIBER TRANSMISSION BAND

CROSS REFERENCE TO RELATED APPLICATIONS

This application claims the benefit of Untied States Provisional Patent Application Ser. No. 62/691,143 filed 28 Jun. 2018 the entire contents of which is incorporated by reference as if set forth at length herein.

TECHNICAL FIELD

This disclosure relates generally to optical systems, methods, and structures. More particularly, it describes bidirectional optical fiber communication and sensing WDM architecture using same fiber transmission band.

BACKGROUND

As is known in the optical arts, distributed fiber sensing (DFS) systems, methods, and structures—including distributed vibration sensing (DVS), distributed acoustic sensing (DTS), and Brillouin optical time domain reflectometry (BOTDR), changes in optical fiber may be detected and located by using optical pulse interrogation methods. In such operations, a single optical fiber is dedicated for use by a single sensing system, or switched between systems at different times if continuous, real-time updates are not required.

Presently, there is growing demand for in-service, commercial optical communications systems to perform optical fiber sensing. However, as communications channels require continuous operation—it remains quite difficult to integrate communications system(s) and sensing system(s) on a common (the same) optical fiber. One reason for such difficulty is that the instantaneous operating power of optical pulse reflectometry in fiber sensing systems is necessarily much higher as compared to communications channels, thus degrading communication performance as a result of any fiber nonlinearity. As a result, the art has employed separate optical fibers—which may be included in a common fiber bundle—for optical communications and optical sensing thereby avoiding interference problems altogether.

Accordingly, a continuing need exists in the art for systems, methods, and structures that provide simultaneous optical communications and optical sensing on a common optical fiber.

SUMMARY

The above problem is solved and an advance in the art is made according to aspects of the present disclosure directed to a bidirectional optical fiber communication and sensing WDM architecture using the same fiber transmission band. In sharp contrast to the prior art—systems, methods, and structures according to aspects of the present disclosure employ bidirectional WDM fiber sharing such that communications channels and optical fiber sensing channel(s) may coexist on the same fiber. Due to the bidirectional propagation taught and described by the present disclosure, nonlinear interaction between communications channels and interrogating pulse(s) of sensing are much reduced or eliminated.

Of particular advantage—systems, methods, and structures according to the present disclosure may advantageously combine two systems in the same fiber using standard WDM multiplexers and de-multiplexers. In such configurations according to the present disclosure, return sensing signal(s) for the distributed fiber sensing (DFS) system will propagate through the optical fiber in the same direction as the communication channels. In such configuration—the DFS signals may be affected by any asynchronous spontaneous emission (ASE) noise from in-line erbium-doped fiber amplifiers (EDFAs) used for communications. Accordingly, this disclosure provides structures and techniques to suppress in-band ASE noise(s)—advantageously, and surprisingly—using standard WDM optics.

As those skilled in the art will readily appreciate, combining fiber communications systems and DFS systems using standard WDM optics presents many advantages. More particularly, systems methods and structures according to the present disclosure eliminate the need for multiple fibers for communications and sensing. As those skilled in the art readily know and appreciate, optical fibers may be a limited resource in optical networks therefore eliminating the need for multiples is of great advantage over the prior art. Additionally—and as compared to the prior art—systems, methods, and structures according to the present disclosure present a much simpler arrangement as standard WDM components may be employed without the need for additional computational and/or digital signal processing (DSP) resources.

As we shall describe in more detail, systems, methods, and structures according to the present disclosure—as compared to the prior art—exhibit significantly better performance characteristics as our systems, methods, and structures may employ band(s) having the lowest fiber loss (typically C-band) for both communications and sensing operation(s). Lastly, since more and more contemporary communications systems use multiple fiber bands due to increasing network capacity demands, using separate bands for DFS systems may be prohibitive in the future.

BRIEF DESCRIPTION OF THE DRAWING

A more complete understanding of the present disclosure may be realized by reference to the accompanying drawing in which.

Figure 1:
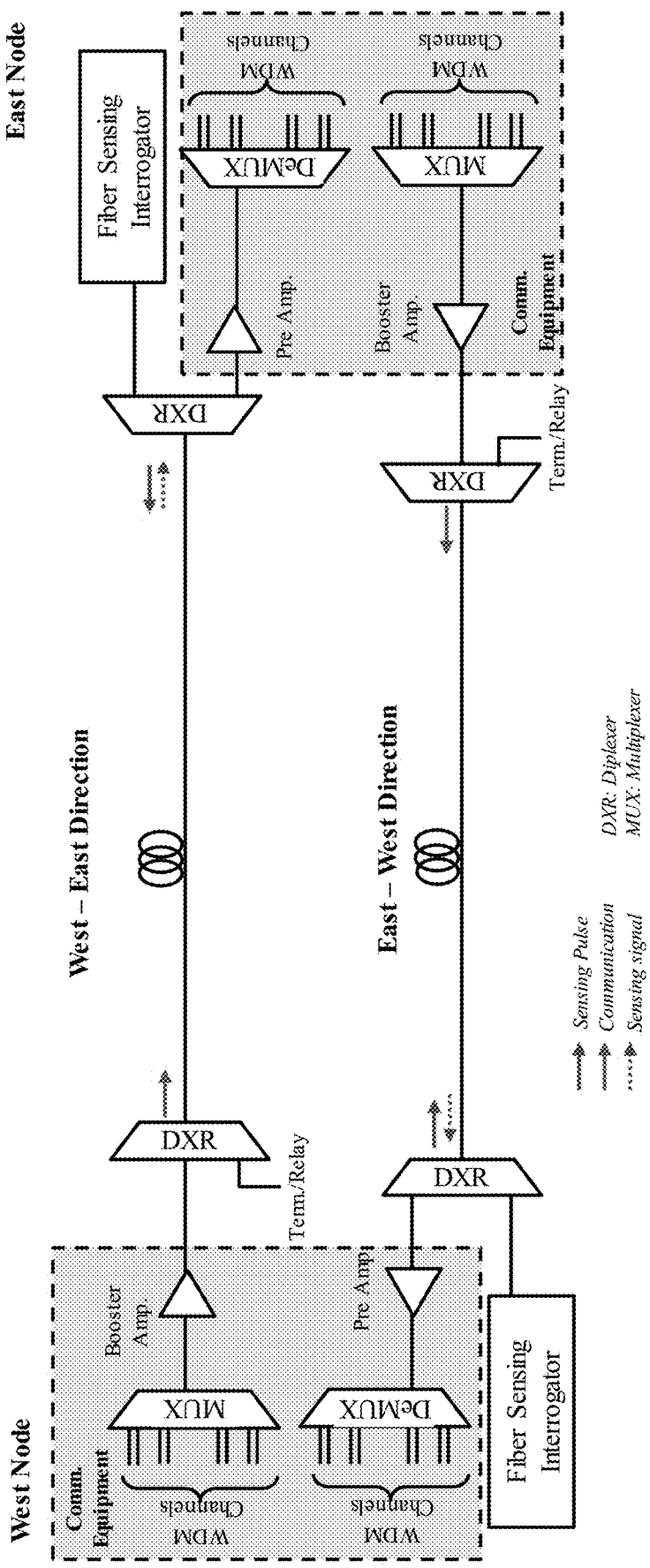
FIG. 1 is a schematic diagram illustrating a dual-use optical fiber communications/sensing system on a single fiber pair according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that there exist prior art attempts directed to reducing instantaneous operation power of optical pulse reflectometry systems such that they can applied to in-service fiber monitoring and fault detections. Illustrative examples of such systems generally employ long correlation codes or swept optical frequencies such that an instantaneous power of interrogating signals may be lowered without sacrificing sensing performance. Unfortunately—and as will be known and appreciated by those skilled in the art, such a prior art approach requires much more signal processing at the interrogator as compared to traditional pulse OTDR. Consequently, significantly more computational resources having higher implementation costs is required for these prior art approaches.

FIG. 1 is a schematic diagram illustrating a dual-use optical fiber communications/sensing system on a single fiber pair according to aspects of the present disclosure. With reference to that figure, it may be observed that the communications channels and DFS system signals are carried on the same optical fiber.

Operationally, the overall system comprises of a fiber-pair which support two-way communication between two nodes. In a typical configuration, only one fiber sensing interrogator is needed for DFS for one fiber cable, however two DFS systems can be implemented in our design for back-up purposes if the fiber pair comprises two fibers within the same cable. The two DFS systems can also be used to for different parameter sensing, e.g. acoustic, vibrational, and temperature. If the fibers are part of different cables having different routes, two DFS systems can be used to capture sensing data along different routes.

As noted previously, since optical interrogation pulses in DFS systems exhibit high peak powers, they will interfere with communication channels if they are co-propagated together due to fiber nonlinearity. In our bi-direction launch architecture according to aspects of the present disclosure, the communication channels and sensing pulses are counter-propagated. In this inventive manner, the effective interaction time/length between the communication signal and sensing pulse is extremely short, thus dramatically reducing the signal interference due to fiber nonlinearity.

As may be observed from the figure, a reflected sensing signal in the DFS system will travel in the same direction as the communication channels, however the weak optical powers (~−80 dB per nanosecond pulse) will advantageously not impact the performance of the communication channels.

Of further advantage, systems, methods, and structures according to the present disclosure advantageously use standard WDM diplexers at a transmitter end (for the communication channels) and at a receiver end to combine the two systems. Still further, wavelength use by DFS interrogator can be either in-band or out-of-band depending on diplexer design however, it is generally preferable to use the same band as the signal for lower cost component and better performance (in C-band).

Advantageously, the diplexers can be implemented using wavelength-selective switch (WSS) technologies to flexibly select the operation wavelengths for the DFS system. It can also be implemented using fixed optical filters for lower monetary cost and insertion loss if the operation wavelength of DFS is fixed. Other than multiplexing and demultiplexing function, the diplexer at the transmitter end also serves an important function of filtering out the in-band ASE noise generated by the EDFAs used for communication. Without optical diplexer at transmitter-end, the reflected sensing signal will be swamped by noise and DFS system will not operate properly. Finally, the demultiplexed interrogating pulse at the transmitter end can either be terminated or relayed to a subsequent fiber span after being amplified by a bidirectional amplifier, to potentially extend the sensing distance.

Figure 2:
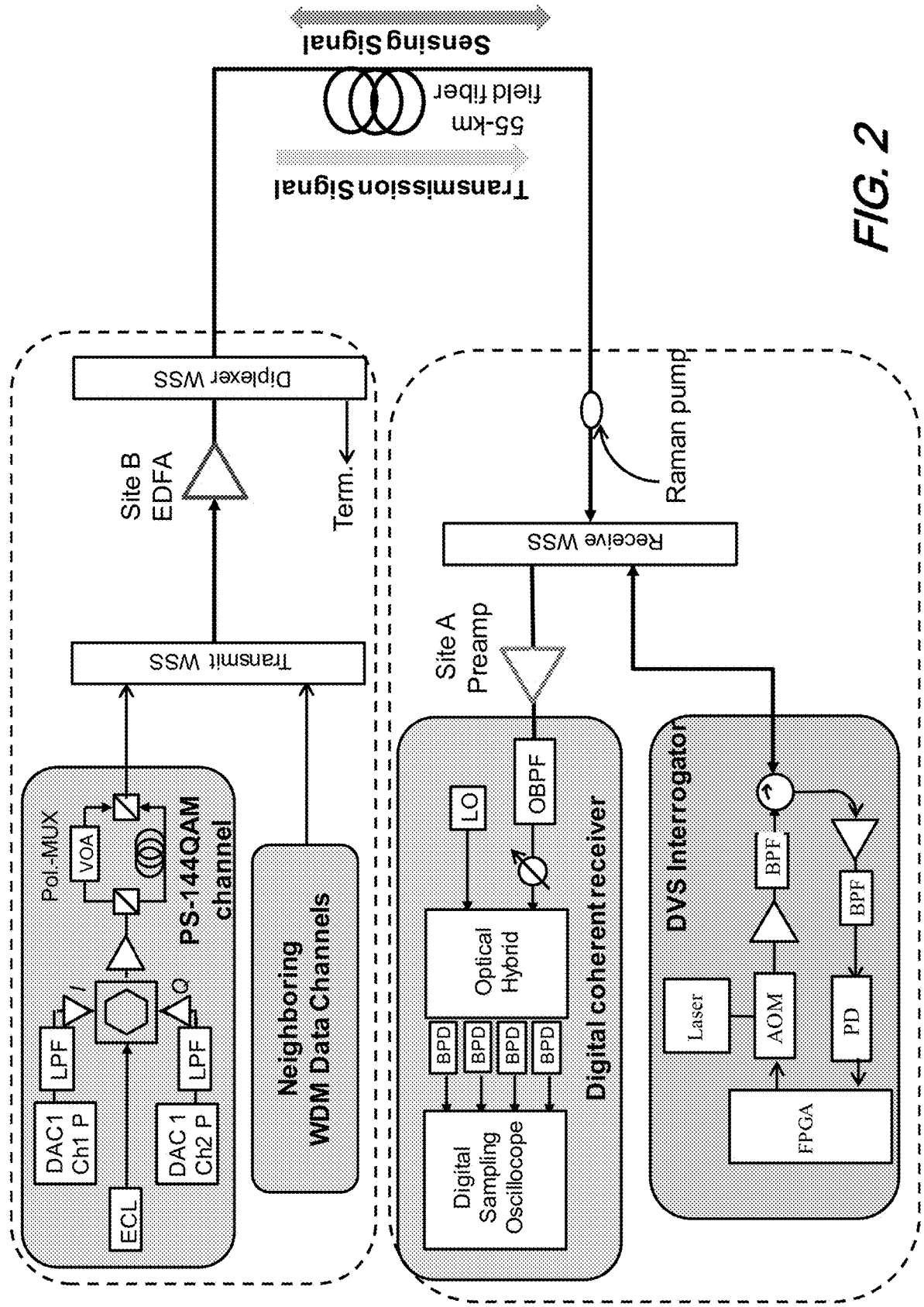
FIG. 2 is a schematic diagram illustrating an experimental setup for testing 55-km DWDM bidirectional communication and sensing architecture according to aspects of the present disclosure.

FIG. 2 is a schematic diagram illustrating an experimental setup for testing 55-km DWDM bidirectional communication and sensing architecture according to aspects of the present disclosure. With reference to that figure, we note that our proof of concept was demonstrated in a field trial using that setup shown. For fiber communication systems, we used a full-C-band DWDM system using a probabilistic shaped (PS) 144-QAM transponder prototype, which supports transmission of 400 Gb/s data rate at 50-GHz DWDM spacing, and additional neighbor WDM channels to fill up the transmission spectrum. We also used a DVS system in our trial bidirectional architecture to monitor ambient vibrations/disturbance along the fiber cable. The fiber used for transmission and sensing is a field installed fiber link within a customer's fiber network connecting site A and site B with a length of 55-km. The transmitter for DWDM communication was placed at site B, while the receiver and the DVS interrogator was placed a site A.

The architecture for the DVS hardware design consists of laser, acoustic-optic modulator (AOM), EDFAs with band-pass filters (BPF), circulators, and photo-detector, with the retrieved data being processed by a real-time FPGA. Despite such specificity for evaluation/trial, we note that systems, methods, and structures according to the present disclosure are applicable to different DFS system design(s). For core/metro fiber communication system, it is typical to use WSS to multiplex and demultiplex channels, which is the de-facto technology used in commercial reconfigurable optical add/ drop multiplexers (ROADM). To evaluate our concepts in the trials, we employed two WSSs—one at each node—for the communication system.

When combining the communication and sensing system in the same fiber, a receive WSS advantageously may also act as a diplexer for coupling in and out the sensing signal at the receiver end. At the transmitter side, however, one additional WSS was used as diplexer because it is necessary to filter out the ASE noise generated by the EDFA, which will compromise the operation of the DVS due to its relative high-power level compared to the reflected sensing signal.

The DVS signal is multiplexed with the DWDM communication channels in C-band.

Figure 3:
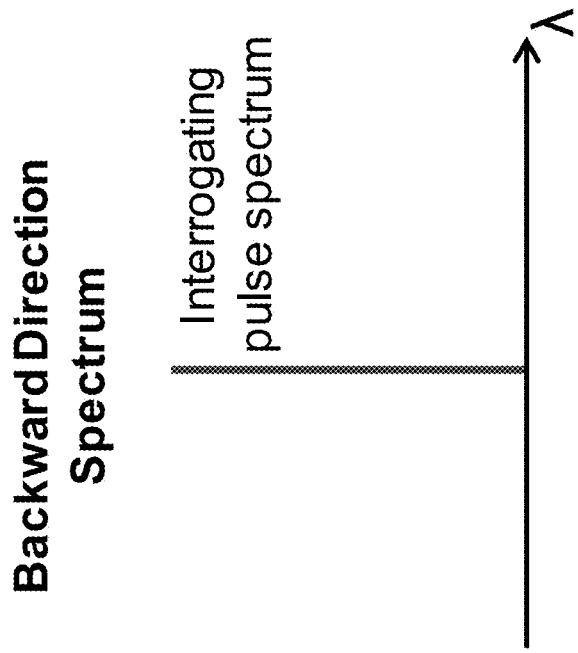
FIG. 3 shows a pair of spectrum plots illustrating bidirectional communication/sensing system signal spectrum map according to aspects of the present disclosure.
Figure 3:
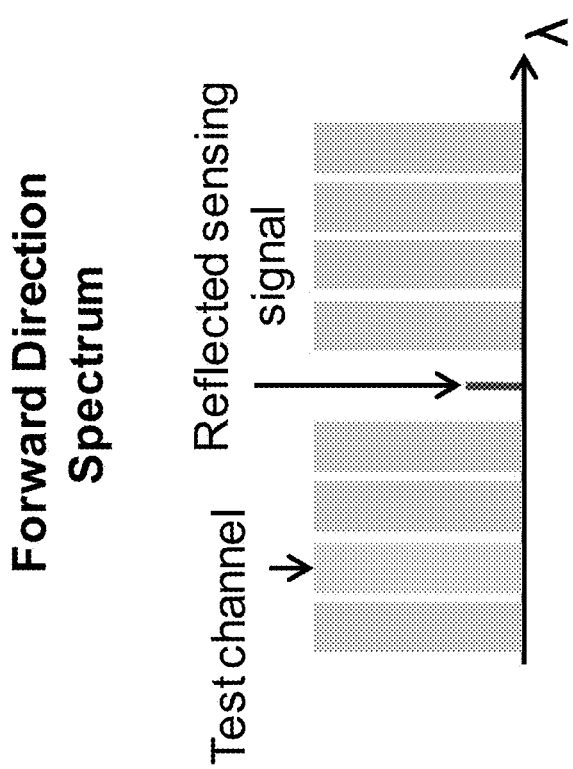

FIG. 3 shows a pair of spectrum plots illustrating bidirectional communication/sensing system signal spectrum map according to aspects of the present disclosure. As may be observed from those plots—in the forward direction—the C-band DWDM communication channels are multiplexed at 50-GHz spacing, with one channel left open for DVS signal operation. The reflected DVS signal is much lower in power compared to the communication channels, thus it won't degrade the transmission performance of the communication channels. The test channel of PS-144QAM was spaced 150-GHz apart from the sensing signal. At the backward direction, only the interrogating pulse spectrum is present. After reaching site B, the interrogating pulse signal will be terminated after diplex WSS to prevent high backward reflection at the fiber end.

Figure 4:
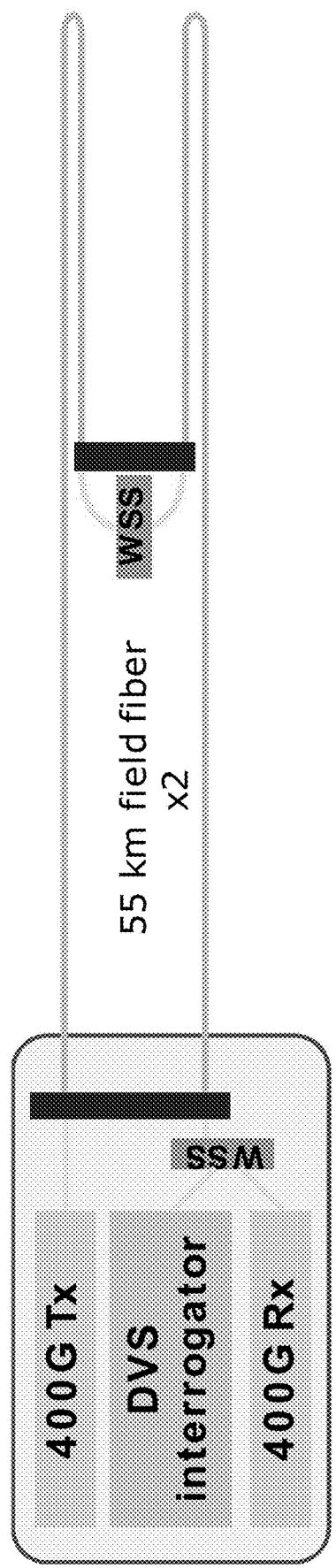
FIG. 4 is a schematic illustrating a bidirectional test arrangement including PS-144QAM prototype transceiver according to aspects of the present disclosure.

FIG. 4 is a simplified schematic diagram illustrating the bidirectional test arrangement including PS-144QAM prototype transceiver according to aspects of the present disclosure.

After the both DWDM communication system and DVS system were setup according to the figure, we were able to achieve simultaneous operation of both systems on the same fiber. Distributed Raman amplification was applied in the backward direction to extend the sensing distance of the DVS to cover the entire 55-km fiber length.

Figure 5:
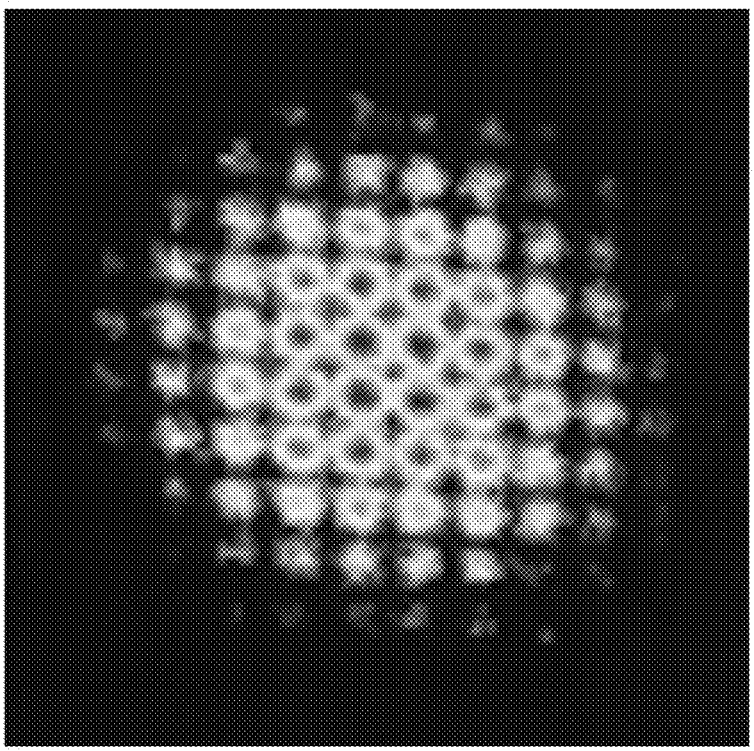
FIG. 5 is a pair of signal constellation plots showing received signal constellation from the PS-144QAM prototype transceiver arrangement of FIG. 4 according to aspects of the present disclosure.
Figure 5:
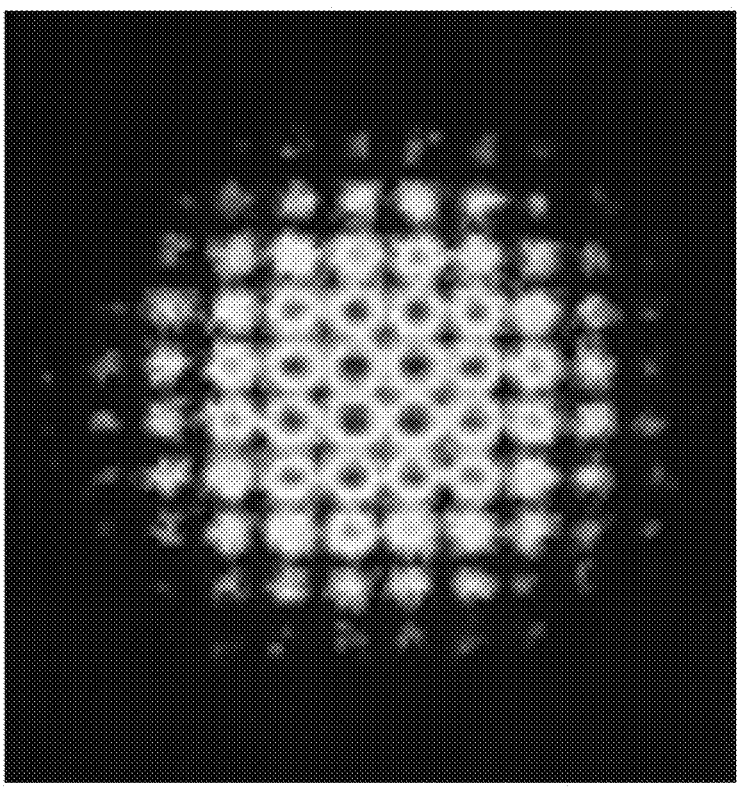

FIG. 5 is a pair of signal constellation plots showing received signal constellation from the PS-144QAM prototype transceiver arrangement of FIG. 4 according to aspects of the present disclosure. More specifically, FIG. 5 shows a received PS-144 QAM signal constellation after coherent detection and DSP. Error free operation was achieved after FEC decoding for 400-Gb/s data rate. No perceptible signal degradation was observed before and after the DVS signal was inserted.

Figure 6:
FIG. 6 is a plot depiction of a waterfall trace obtained by distributed vibrational sensing (DVS) showing ambient vibration signatures along a cable route according to aspects of the present disclosure.

FIG. 6 is a plot depiction of a waterfall trace obtained by distributed vibrational sensing (DVS) showing ambient vibration signatures along a cable route according to aspects of the present disclosure. As shown in the figure the ambient vibration intensity is shown along different time (vertical axis) and location (horizontal axis). Advantageously, the test system was able to capture all vibration events for the full 55-km fiber lengths while the DWDM communication system was in operation. The diagonal lines on the water-fall plot indicated vehicles moving along the roadways, where the customer's fiber cable was installed next to. Using the retrieved DVS data, one can determine traffic information such as vehicle moving direction, number of vehicles on road, vehicle speed, spacing between vehicles, etc.

FIG. 6 is a plot depiction of a waterfall trace obtained by distributed vibrational sensing (DVS) showing ambient vibration signatures along a cable route according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved optical fiber communication and sensing arrangement CHARACTERIZED BY:
   bidirectional optical fiber communication and optical fiber sensing employing a same optical fiber transmission band;
   counter-propagation of communication channels and optical interrogating pulse(s);
   a reduction in signal degradation caused by fiber nonlinearity resulting from the counter-propagation of the communication channels and optical interrogating pulse(s); and
   removing in-band ASE noise from erbium-doped fiber amplifiers (EDFAs) by optical filtering communication channels such that sensing operations are unencumbered.

* * * * *